United States Patent [19]

Pigott et al.

[11] Patent Number: 5,148,633

[45] Date of Patent: Sep. 22, 1992

[54] TOOL FOR RESURFACING EXHAUST PORT FLANGES

[76] Inventors: Michael Pigott, 10611 Lakeview Dr.; Woodruff Kozlow, 10720 Skyhawk Dr., both of New Port Richey, Fla. 34654

[21] Appl. No.: 713,871

[22] Filed: Jun. 12, 1991

[51] Int. Cl.⁵ .................................................. B24B 7/00
[52] U.S. Cl. ...................................... 51/126; 51/241 S; 51/241 VS; 51/55
[58] Field of Search ................ 51/241 VS, 241 S, 55, 51/119, 120, 126, 71, 109 R, 124 R, 125, 241 R; 403/4, 362, 384, 388

[56] References Cited

U.S. PATENT DOCUMENTS

| | | | |
|---|---|---|---|
| 481,988 | 9/1892 | Weyburn | 51/126 |
| 692,425 | 2/1902 | Cavicchi | 51/126 |
| 1,667,918 | 5/1928 | Willis | 51/241 VS |
| 1,699,475 | 1/1929 | Miller | 51/241 VS |
| 1,749,514 | 3/1930 | Scott | 51/241 VS |
| 1,924,958 | 8/1933 | Patterson | 51/241 VS |
| 2,248,262 | 7/1941 | Wilhide | 51/124 R |
| 2,305,889 | 12/1942 | McQuade | 51/241 S |
| 4,234,275 | 11/1980 | Clement | 51/241 S |
| 4,438,600 | 3/1984 | Berbakov | 51/241 S |

Primary Examiner—Bruce M. Kisliuk
Assistant Examiner—Bryan Reichenbach
Attorney, Agent, or Firm—Stanley M. Miller

[57] ABSTRACT

A tool that enables resurfacing of exhaust port flanges in the substantial absence of engine disassembly. An air motor that controls rotation of a resurfacing device is carried at the end of an arm assembly including an elbow like joint so that the motor is positionable over a wide range of positions. The proximal end of the arm assembly is mounted on a shaft and an adjustment knob enables the position of the arm assembly and hence the motor to be axially adjusted to facilitate positioning of the motor with respect to the port to be resurfaced. The shaft has a first part with a flat bottom that overlies a base plate that is secured to a cylinder head and spaced from the head by elongate spacers. Fine adjustment of the motor's position is achieved by rocking a preselected end of the shaft away from the base plate and by tilting the shaft laterally with respect to the base plate.

11 Claims, 4 Drawing Sheets

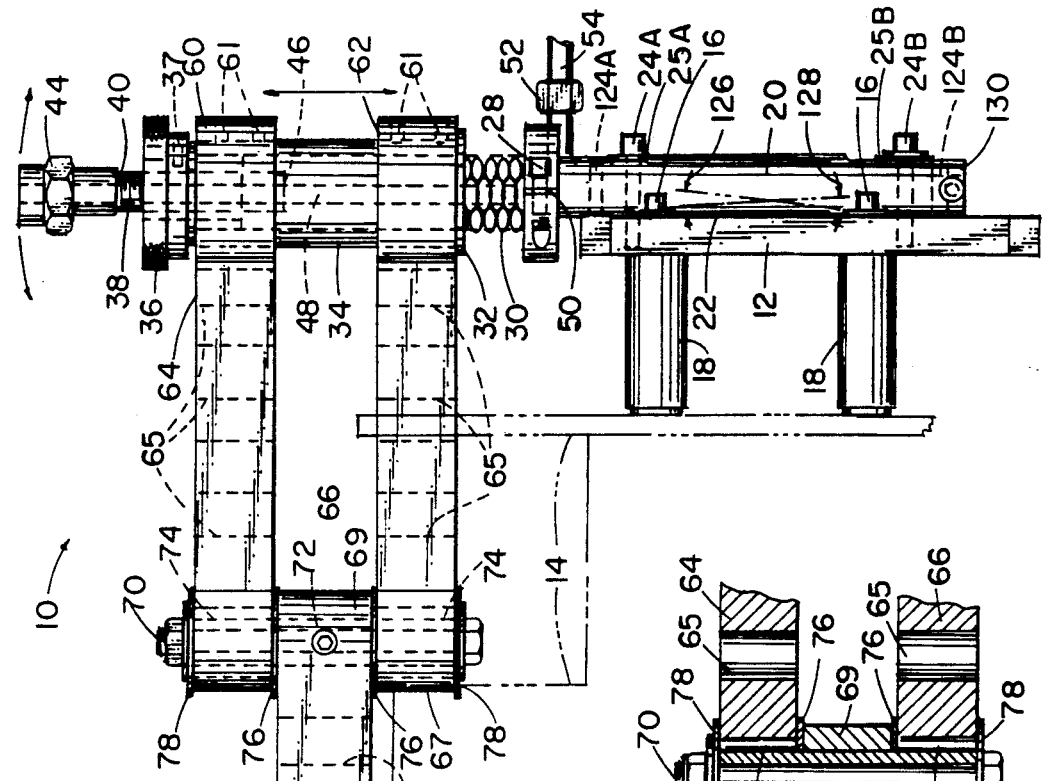
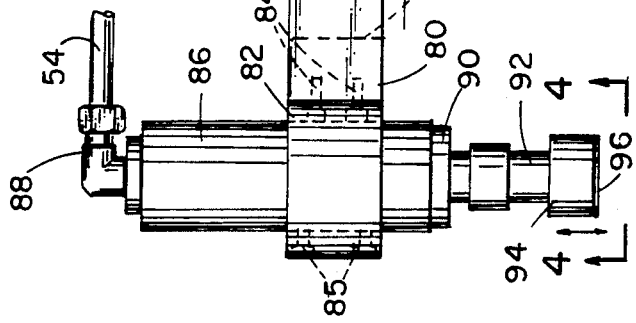
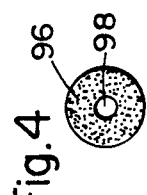
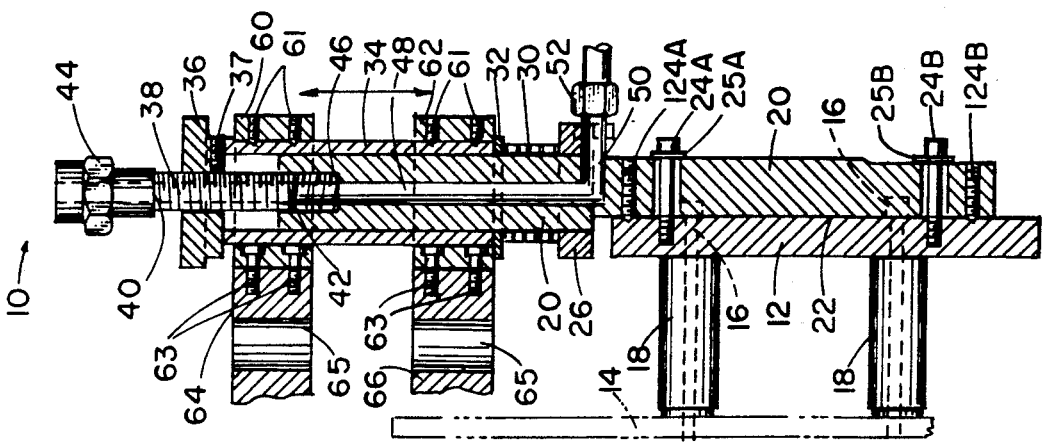

5,148,633

TOOL FOR RESURFACING EXHAUST PORT FLANGES

BACKGROUND OF THE INVENTION

1. Field of the Invention

This invention relates, generally, to tools. More particularly, it relates to a tool having utility in the resurfacing of exhaust port flanges.

2. Description of the Prior Art

Erosion of exhaust port flanges, the point of attachment of exhaust headers and manifolds, is a recurring problem in the repair of internal combustion engines generally and in air-cooled engines, such as those found in motorcycles and aircraft, in particular. This problem also exists in non-air-cooled engines, as well; however, it is with aircraft engines that the problem is most troublesome and problematic.

Intake port flanges, not being subjected to the intense heat of exhaust gases, are not as susceptible to the erosion problem.

Prior to the present disclosure, an engine requiring resurfacing of its exhaust port flange faces was required to be removed from its vehicle and dismantled, at least to the point of removing the entire cylinder from the crankcase, leaving the piston with the crankcase. Removal of the valve cover, and in many cases, the overhead valve mechanisms before mounting the cylinder head in proper juxtaposition with a milling machine for resurfacing of the exhaust port flange face, was also required. Then, upon completion of the resurfacing operation, the cylinders were required to be reassembled to the crankcase, which involved re-insertion of the pistons therein, plus re-assembly of the valve train, valve cover, re-adjustment of valves, and re-installation of the engine to the vehicle. All of these steps required considerable labor, replacement of gaskets, and other cost items to the consumer.

However, the prior art, when considered as a whole in accordance with the requirements of law, neither teaches nor suggests how the job could be done more efficiently.

SUMMARY OF THE INVENTION

The present invention requires only the removal of the valve cover, attachment of the novel tool disclosed herein to the cylinder head, plugging up of appropriate apertures with rags or the like, resurfacing the port flange face, blowing off dust particles with an air hose, and reassembly of the valve cover.

The novel tool is mounted at the end of an arm having an elbow joint formed therein to facilitate placement of the tool as required with respect to the port to be resurfaced. The resurfacing is accomplished by suitable drums or grinding devices that are held in a collet and rotated by a pneumatic motor.

Thus, it is clear that the primary object of this invention is to revolutionize the internal combustion engine repair industry by disclosing, for the first time anywhere in the world, a tool that enables exhaust port resurfacing in the substantial absence of engine disassembly.

Many other advantages and applications of the invention will become apparent as this description proceeds.

The invention accordingly comprises the features of construction, arrangement of parts, and combination of elements hereinafter set forth, and the scope of the invention will be indicated in the claims.

BRIEF DESCRIPTION OF THE DRAWINGS

For a fuller understanding of the invention, reference should be made to the following detailed description, taken in connection with the accompanying drawings, in which:

FIG. 2 is a side elevational view thereof;

FIG. 3 is a vertical sectional view of the base of said embodiment taken along line 3—3 in FIGS. 6 and 7;

FIG. 4 is a bottom view of the grinder face;

FIG. 5 is a partial sectional view of the elbow part of the novel apparatus taken along line 5—5 in FIG. 7;

DETAILED DESCRIPTION OF THE PREFERRED EMBODIMENT

Figure 1:
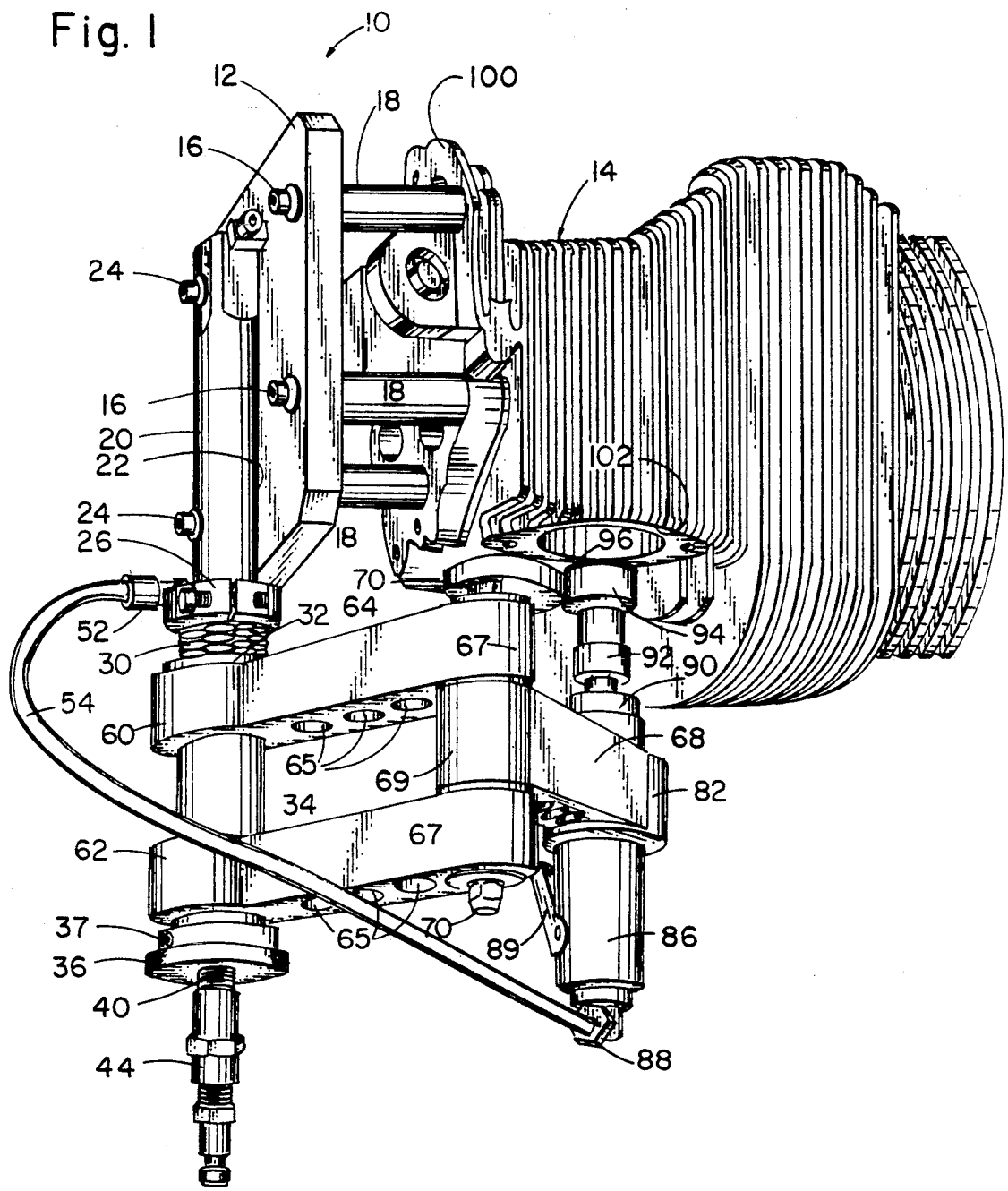
FIG. 1 is a perspective view of an exemplary embodiment of the invention as most often used, i.e., in an inverted position.

Referring now to FIG. 1, it will there be seen that the novel apparatus is denoted by the numeral 10, with arrow, as a whole. It includes a base plate 12 which is shown fastened to the top of a typical cylinder head 14 of an air-cooled engine (such as an aircraft engine) by means of four attachment allen head bolts 16 (two of which are visible in this view) and is spaced from the cylinder head by cylindrical spacers 18, said spacers being as elongate as is appropriate for a particular engine being worked upon. More particularly, each both 16 is elongate and extends through the bore of its associated spacer. The leading end of each bolt screw threadedly engages cylinder head 14 and the head of each bolt overlays base plate 12 so that each cylindrical spacer is sandwiched between its associated bolt head and leading end as its associated bolt is tightened. Note that base plate 12 is substantially parallel to the generally flat top of the cylinder head 14. Vertical shaft 20 is attached to the exterior of the base plate 12 and flat side 22 thereof is disposed in overlying relation thereto. Allen head bolts 24A and 24B form the attachment means for securing the shaft 20 to plate 12. Only that part of the shaft that abuts base plate 12 is flat; the balance of shaft 20 has a circular cross section. Thus, shaft 20 has a first part of semicircular cross section and a second part of circular cross section.

As perhaps best seen in FIG. 2, just above the base plate is a stop collar 26, secured by allen head bolt 28. Above the collar 26 is a slidably mounted compression spring 30, a washer 32, and a cylindrical barrel 34. Barrel 34 is preferably made of bronze or similar bushing material suitable to be slidably mounted upon the circular-in-section second part of shaft 20. Above the shaft 20 and bushing 34 is a knurled adjusting knob 36 which includes an externally threaded pipe nipple 38, threaded at both ends as at 40 and 42. An air hose connecter 44 is threadably attached to end 40.

Knob 36 is secured to nipple 38 by set screw 37. External threads 42 engage internally threaded end 46 of shaft 20, which is in fluid communication with bore 48 of shaft 20. The internal open end 40 of nipple 38 is hexagonal to receive an allen wrench for threadable insertion of the nipple into internal threads of the hose connector 44 without marring the external surfaces of the nipple 38. At the bottom end of bore 48 is a horizontally disposed bore 30 which is internally threaded to receive another air hose connection 52 with hose 54. Thus, connection 44 and connection 52 are in fluid communication with one another at all times during vertical adjustment of the barrel bushing 34.

Upon the barrel bushing 34 are mounted a pair of radially extending arms 64 and 66 which are fastened to collars 60 and 62 respectively. The collars 60 and 62 are permanently affixed to the barrel bushing 34 by means of set screws 61, while collars 60 and 62 are permanently affixed to the arms 64 and 66 by internally mounted screws or bolts 63. There are a plurality of material saving and lightening holes 65 formed in arms 64 and 66, as shown in FIGS. 2, 3, 5, 6 and 7; the arms are shown fully extended for clarity. Third arm 68 is coaxially mounted between arms 64 and 66 as at 70. This coaxial elbow-like connection includes a bolt 70 (note FIG. 5), snugly mounted within a bushing 72 which is press fit into the elbow pivot end 69 of arm 68 having material saving and lightening holes 71. The elbow pivot ends 67 of arms 64 and 66 are fitted with conventional needle bearings 74, while the arms themselves are separated vertically by bronze or nylon washers 76 and capped top and bottom by bronze or nylon washers 78 to allow smooth and precise pivotal motion at said elbow.

At the distal end 80 of the third arm 68 is a collar 82 fastened with bolts 84, said collar being a vertically adjustable means for mounting a conventional air-driven motor 86. Motor 86 is held in place by a plurality of set screws 85, and is fitted with an air hose connector 88, which, in turn, communicates with hose 54. An actuator 89, shown in FIG. 1, operates motor 88.

At the boom end 90 of the motor 88 is a collet 92 into which are mounted various drums or grinding devices 94. At the underside of drum 94 is an adhesively attached abrasive disc 96 which has an aperture 98 formed therein to preclude galling of the surface to be ground.

Figure 7:
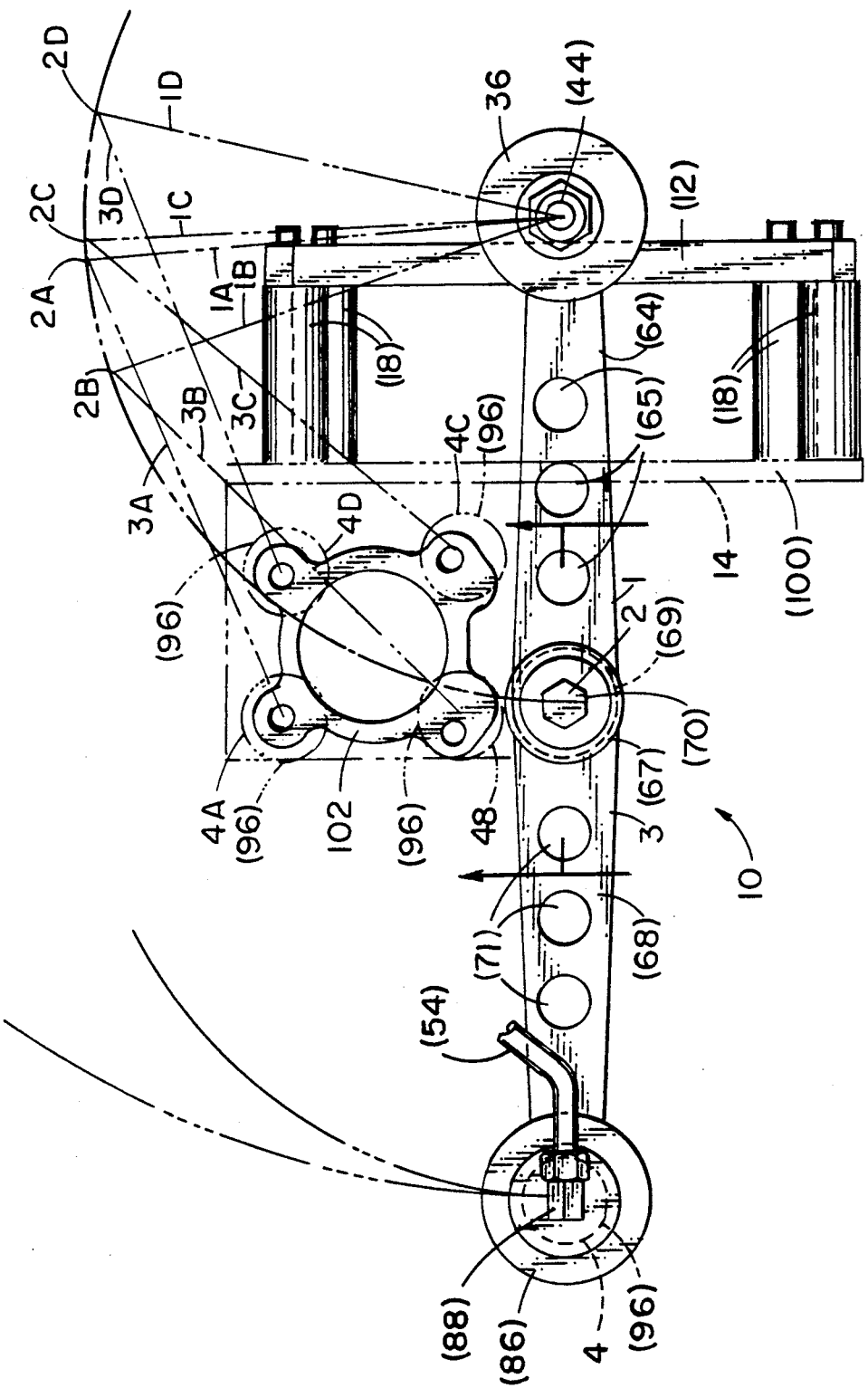
FIG. 7 is a top plan view thereof.

FIG. 7 depicts the arms fully extended. Shown in phantom lines is the top part 100 of a cylinder 14, to which the novel apparatus is attached as previously described. Also shown, in solid lines, is a typical exhaust port flange 102 of a cylinder which is to be resurfaced. Single line diagrams, hereinafter described, depict four different positions of the grinder device facing disc 96. In use, the disc is moved in a somewhat rotary motion about the exhaust port flange surface 102 as the grinding or resurfacing progresses.

For simplicity and clarity in depicting their respective positions, the arms, pivot points, and abrasive disc are renumbered 1, 2, 3, and 4 in the extended positions, and their respective successive positions are numbered 1A, 2A, 3A, 4A, 1B, 2B, etc., in the diagrammatic locations or positions. The previously assigned numbers of these parts are also shown, in parentheses, in this view.

In the claims that follow, the arm assembly including arms 64, 66, and third arm 68 is referred to as an arm means.

Returning now to FIGS. 2 and 3, a description follows to more fully disclose the inherent tilting adjustments of the novel apparatus to match exhaust port surfaces which may not necessarily be perpendicular to the cylinder head surface to which the apparatus is attached. As pointed out earlier, shaft 20 is attached to plate 12 by means of bolts 24A and 24B. The holes in shaft 20 through which bolts 24A and 24B extend are somewhat oversized to permit these tilting adjustments, therefore enabling the utilization of washers 25A and 25B to compensate for the oversized holes. The flat surface 22 of the shaft 20 assures proper contact of the shaft 20 with the base plate 12 at all times throughout any adjustments. By loosening bolt 24A, a set screw 124A can be driven inwardly against base plate 12 to tilt the shaft outwardly as indicated by arrows and radial lines 126. In a similar manner, by loosening bolt 24B and driving set screw 124B inwardly against the base plate 12, shaft 20 is tilted inwardly as indicated by arrows and radial lines 128. After appropriate adjustment, bolts 24A or 24B are tightened for precise alignment of the facing disc to the flange surface.

Figure 6:
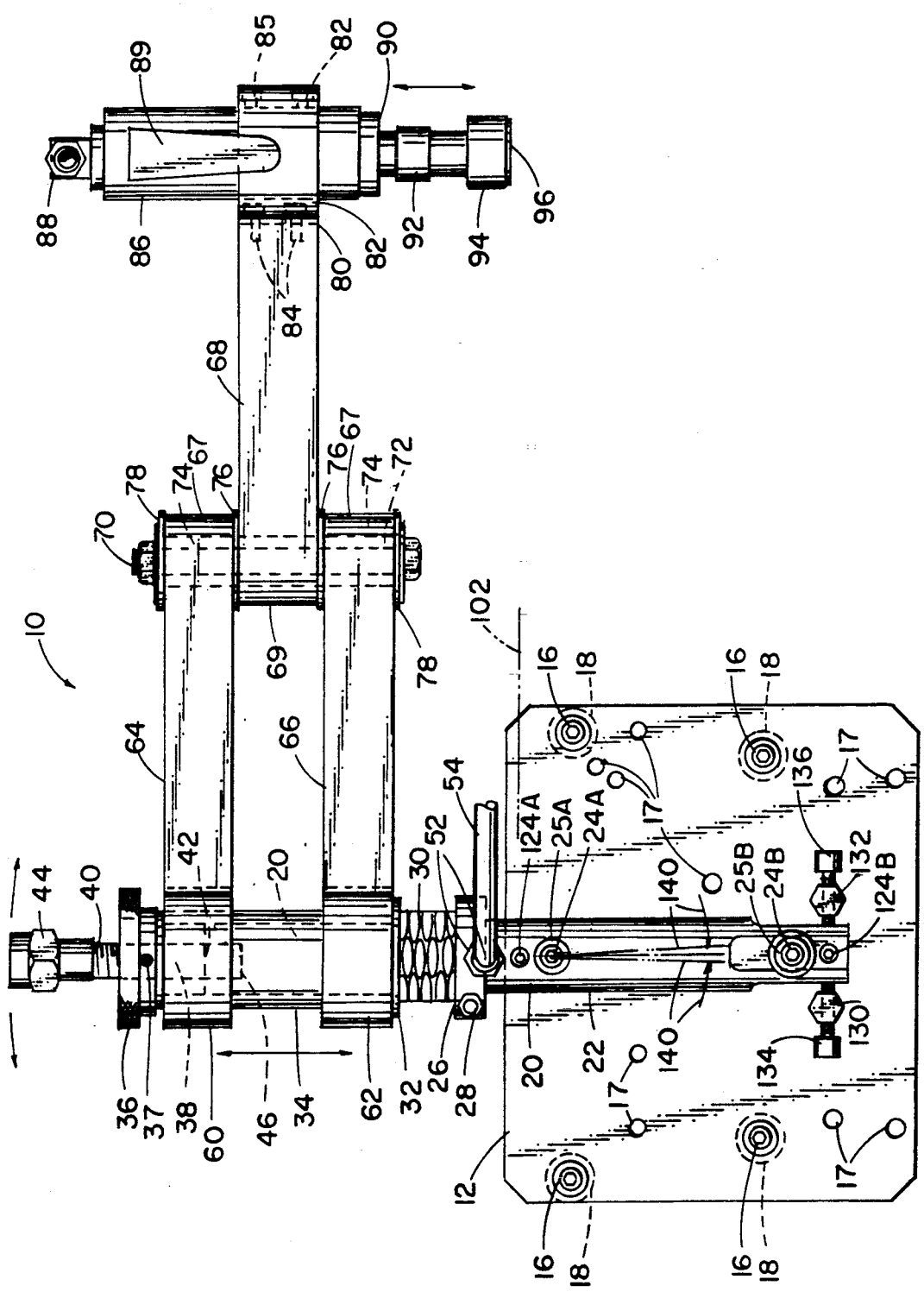
FIG. 6 is an end elevational of the novel apparatus.

Referring now to FIG. 6, there are shown two hexagonal bosses 130 and 132 permanently mounted to the base 12. Through these internally threaded bosses 130 and 132 are set screws 134 and 136, respectively. By loosening bolts 24A and 24B, and by alternately turning set screws 134 and 136, a left or right hand tilt can be imparted to shaft 20, as indicated by the arrows and radial lines 140. After such left or right adjustment is made, the bolts 24A and 24B are tightened for precise alignment of the disc to flange surface. Holes 17 in plate 12 are mounting holes for various configurations of different cylinder heads.

It must be reiterated here that for inward or outward adjustment, the flat surface of shaft 20 must be in contact with plate 12 at either the top or bottom. Moreover, for the side-to-side tilt adjustment, the flat surface must be in contact with the plate at top or bottom. In this manner, in the tightening of the bolts 24A and 24B, one of said bolts will have a precise surface upon which to bear.

Thus, from the foregoing description, it can be readily understood that through the use of this invention, precise and accurate machining of eroded exhaust port flanges is accomplished without the tedius removal of an entire cylinder (or cylinders) from an engine, plus removal of valves, set up on a milling machine and reassembly of an engine. Much time, energy and cost is thereby eliminated.

This invention is clearly new and useful. More importantly, it was not obvious to those of ordinary skill in this art at the time it was made, in view of the prior art as a whole.

It will thus be seen that the objects set forth above, and those made apparent by the foregoing description, are efficiently attained, and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,
What is claimed is:
1. A tool for resurfacing the exhaust port flanges of an aircooled engine having a cylinder head, comprising:
    a flat base plate;
    spacer means for spacing said base plate in substantially parallel relation to said cylinder head;
    a shaft having a first part of semicircular cross section and a second part of circular cross section;

attachment means for securing said shaft first part in abutting, overlaying relation to said base plate;

an arm means pivotally mounted to said shaft second part;

said arm means including a first pair of arm members pivotally mounted to said shaft second part and a third arm member pivotally mounted to said first pair of arm members in an elbow joint;

a motor means mounted to a distal end of said arm means;

said motor means being carried by a distal end of said third arm member to provide a wide range of motion for the motor means and hence the flange resurfacing means;

adjustment means for adjusting the position of said motor means along its longitudinal axis;

said adjustment means including a stop collar fixedly secured to the second part of said shaft adjacent said base plate, a bias means that axially receives said second part of said shaft and which bears against said stop collar, a bushing that axially receives said second part of said shaft, a first collar member that axially receives said bushing and that is fixedly secured thereto, said bias means bearing against said first collar member, a second collar member that axially receives said bushing and that is fixedly secured thereto, and an adjustment knob that bears against said second collar member, whereby rotation of said adjustment knob compresses or releases said bias means, dependent upon the direction of knob rotation, and whereby said bias means urges said bushing and hence said first and second collar members to travel axially with respect to said second part of said shaft, said arms and hence said motor means being fixedly connected to said first and second collar members and being axially displaceable therewith;

said second part of said shaft being hollow and internally threaded for screw threadedly receiving a hollow nipple member to which said adjustment knob is secured so that rotation of said adjustment knob is transmitted to rotation of said nipple member so that axial travel of said adjustment knob causes axial travel to said bushing and hence of said arm means and motor means;

actuating means for operating said motor means; and a flange resurfacing means secured to an output shaft of said motor means and being rotatable when said motor means is actuated;

whereby an exhaust port flange is resurfaced in the substantial absence of engine disassembly.

2. The tool of claim 1, further comprising an air hose connector engaged to said nipple, an air hose connector engaged to said shaft, and an air hose disposed in fluid communication between said shaft air hose connector and said motor means so that compressed air introduced into said nipple air hose connector flows through said hollow second part of said shaft, through said air hose, and into said motor means.

3. The tool of claim 2, wherein said first and second collar members and hence said pair of arm members are mounted to opposite ends of said bushing and are spaced sufficiently apart to receive therebetween a proximal end of said third arm member, said proximal end of said third arm member being in alignment with respective distal ends of said pair of arm members and being pivotally mounted with respect thereto.

4. The tool of claim 3, wherein material saving and lightening apertures are formed in said pair of arm members and in said third arm member.

5. The tool of claim 1, further comprising shaft adjustment means for tilting said shaft as needed to bring said motor means into perpendicular alignment with an exhaust port to be resurfaced.

6. The tool of claim 5, wherein said shaft adjustment means includes a plurality of screw members that secure said first part of said shaft to said base plate, a set screw being disposed adjacent to each of said screw members, wherein said screw members are disposed perpendicular to said base plate, wherein said first part of said shaft is apertured to receive each of said screw members, wherein said apertures are oversized to allow movement of said screw members within their respective apertures, and further comprising washer members for positioning between respective heads of said screw members and said first part of said shaft so that unequal distribution of washer members results in tilting of said second part of said shaft and hence of said motor means with respect to said base plate when a preselected screw member of said screw members is first loosened and its associated set screw is advanced and said preselected screw member is then tightened.

7. The tool of claim 6, wherein there are two of said screw members, wherein said screw members are positioned at opposite ends of said first part of said shaft, and wherein a flat bottom part of said first part of said shaft maintains contact between the shaft and the base plate throughout the tilting process.

8. The tool of claim 7, further comprising means for slideably displacing said first part of said shaft with respect to said base plate, said means for slideably displacing said shaft including a pair of boss members positioned on opposite sides of said first part of said shaft, said boss members being fixedly secured to said base plate, and further comprising a set screw member screw threadedly received by each of said boss memnbers so that selective turning of said set screw members effects sliding displacement of said first part of said shaft relative to said base plate when the screw members securing said shaft to said base plate are loosened, said first part of said shaft and said base plate being in continuous abutting contact with one another during said sliding displacement.

9. A tool for resurfacing the exhaust port flanges of an air-cooled engine having a cylinder head, comprising:

a flat base plate;

a plurality of cylindrical spacer members sandwiched between said base plate and said cylinder head for spacing said base plate in substantially parallel relation to said cylinder head;

an elongate bolt disposed within the bore of each of said spacer members for securing each spacer member to said cylinder head, each bolt having a leading end disposed in screw threaded engagement with said cylinder head and a bolt head disposed in overlaying relation to said base plate so that tightening each bolt tightens its associated spacer member between the cylinder head and the base plate;

a shaft having a first part of semicircular cross station and a second part of circular cross section;

attachment means for securing said shaft first part in abutting, overlaying relation to said base plate;

an arm means pivotally mounted to said shaft second part;

a motor means mounted to a distal end of said arm means;

actuating means for operating said motor means;

a flange resurfacing means secured to an output shaft of said motor means and being rotatable when said motor means is actuated;

whereby an exhaust port flange is resurfaced in the substantial absence of engine disassembly.

10. The tool of claim 9, wherein said arm means includes a first pair of arm members pivotally mounted to said shaft second part and a third arm member pivotally mounted to said first pair of arm members in an elbow joint, and wherein said motor means is carried by a distal end of said third arm member to thereby provide a wide range of motion for the rotor means and hence the flange resurfacing means.

11. The tool of claim 10, further comprising adjustment means for adjusting said motor means along its longitudinal axis.

* * * * *